(12) United States Patent
Christofferson et al.

(10) Patent No.: US 12,523,005 B2
(45) Date of Patent: Jan. 13, 2026

(54) CONTROL SYSTEM AND METHOD FOR A WORK TOOL ON A UTILITY VEHICLE

(71) Applicant: Deere & Company, Moline, IL (US)

(72) Inventors: Craig Christofferson, Dubuque, IA (US); Adam H. Kwiatkowski, Dubuque, IA (US); Mark L. Lemke, Peosta, IA (US)

(73) Assignee: DEERE & COMPANY, Moline, IL (US)

( * ) Notice: Subject to any disclaimer, the term of this patent is extended or adjusted under 35 U.S.C. 154(b) by 1112 days.

(21) Appl. No.: 17/452,865

(22) Filed: Oct. 29, 2021

(65) Prior Publication Data

US 2023/0138107 A1 May 4, 2023

(51) Int. Cl.
*E02F 3/84* (2006.01)

(52) U.S. Cl.
CPC .................. *E02F 3/847* (2013.01)

(58) Field of Classification Search
CPC .......... E02F 3/847; E02F 3/844; E02F 9/265; E02F 9/262; E02F 9/205
See application file for complete search history.

(56) References Cited

U.S. PATENT DOCUMENTS

| 11,142,890 B2 * | 10/2021 | Peat | E02F 3/765 |
| 2019/0032305 A1 | 1/2019 | Hageman et al. | |
| 2020/0359546 A1 * | 11/2020 | Ptacek | A01B 63/32 |
| 2021/0004744 A1 * | 1/2021 | Petrany | G07C 5/008 |
| 2021/0176909 A1 * | 6/2021 | Foster | A01B 79/005 |

FOREIGN PATENT DOCUMENTS

| DE | 102015209416 A1 | 2/2016 |
| DE | 102005005557 C5 | 3/2019 |
| DE | 1019211801 A1 | 2/2020 |
| EP | 3167698 A1 | 5/2017 |
| EP | 3105544 B1 | 8/2019 |

OTHER PUBLICATIONS

German Search Report issued in application No. DE102022209295.3 dated May 17, 2023 (12 pages).

* cited by examiner

*Primary Examiner* — Scott A Browne
*Assistant Examiner* — Lidia Kwiatkowska

(57) ABSTRACT

In accordance with an example embodiment, a system for controlling a work tool for a utility vehicle, the system comprising the work tool, one or more movement mechanisms coupled with the work tool, an imaging apparatus, and a controller, wherein the controller is configured to apply the work tool to a surface during movement of a utility vehicle, wherein the work tool is in a first position exerting a first pressure towards the surface, capture, by the first imaging apparatus, a first image of the surface proximate the work tool, evaluate, by a processor, the first image to determine an area of the surface affected by the work tool, and adjust, by the one or more moving mechanisms, the work tool to a second position exerting a second pressure towards the surface, based on the evaluation of the first image.

20 Claims, 6 Drawing Sheets

CONTROL SYSTEM AND METHOD FOR A WORK TOOL ON A UTILITY VEHICLE

TECHNICAL FIELD

The present disclosure generally relates to a utility vehicle. An embodiment of the present disclosure relates to a control system for work tool on utility vehicles.

BACKGROUND

Utility vehicles, such as motor graders, skid and track loaders, and dozer crawlers often move material along a surface using a work tool. Controlling an amount of pressure on the work tool towards a surface to move a desired amount of material is difficult and requires frequent adjustment. An improved system for controlling the pressure of the work tool on the work surface would help reduce operator fatigue and also reduce unnecessary and/or premature wear on parts of the utility vehicle.

SUMMARY

Various aspects of examples of the present disclosure are set out in the claims.

According to a first aspect of the present disclosure, a system for controlling a work tool for a utility vehicle, the system comprising the work tool, one or more movement mechanisms coupled with the work tool, an imaging apparatus, a non-transitory computer-readable memory storing operation information, and an electronic processor configured to apply the work tool to a surface during movement of a utility vehicle, wherein the work tool is in a first position exerting a first pressure towards the surface, capture, by the first imaging apparatus, a first image of the surface proximate the work tool, evaluate, by the electronic processor, the first image to determine an area of the surface affected by the work tool, and adjust, by the one or more moving mechanisms, the work tool to a second position exerting a second pressure towards the surface, based on the evaluation of the first image.

According to a second aspect of the present disclosure, a method of adjusting a pressure applied to a work tool on a surface, the method comprising applying the work tool to the surface during movement of a utility vehicle, wherein the work tool is in a first position exerting a first pressure towards the surface, capturing, by an imaging apparatus, a first image of the surface proximate the work tool, evaluating, by an electronic processor, the first image to determine an area of the surface affected by the work tool, and adjusting, by one or more moving mechanisms, the work tool to a second position exerting a second pressure towards the surface, based on the evaluation of the first image.

According to a third aspect of the present disclosure, work vehicle comprising a work tool, one or more movement mechanisms coupled with the work tool, an imaging apparatus, a non-transitory computer-readable memory storing operation information, and an electronic processor configured to apply the work tool to a surface during movement of the utility vehicle, wherein the work tool is in a first position exerting a first pressure towards the surface, capture, by the first imaging apparatus, a first image of the surface proximate the work tool, evaluate, by the electronic processor, the first image to determine an area of the surface affected by the work tool, and adjust, by the one or more movement mechanisms, the work tool to a second position exerting a second pressure towards the surface, based on the evaluation of the first image.

The above and other features will become apparent from the following description and accompanying drawings.

BRIEF DESCRIPTION OF THE DRAWINGS

The detailed description of the drawings refers to the accompanying figures in which.

Like reference numerals are used to indicate like elements throughout the several figures.

DETAILED DESCRIPTION

Figure 1:
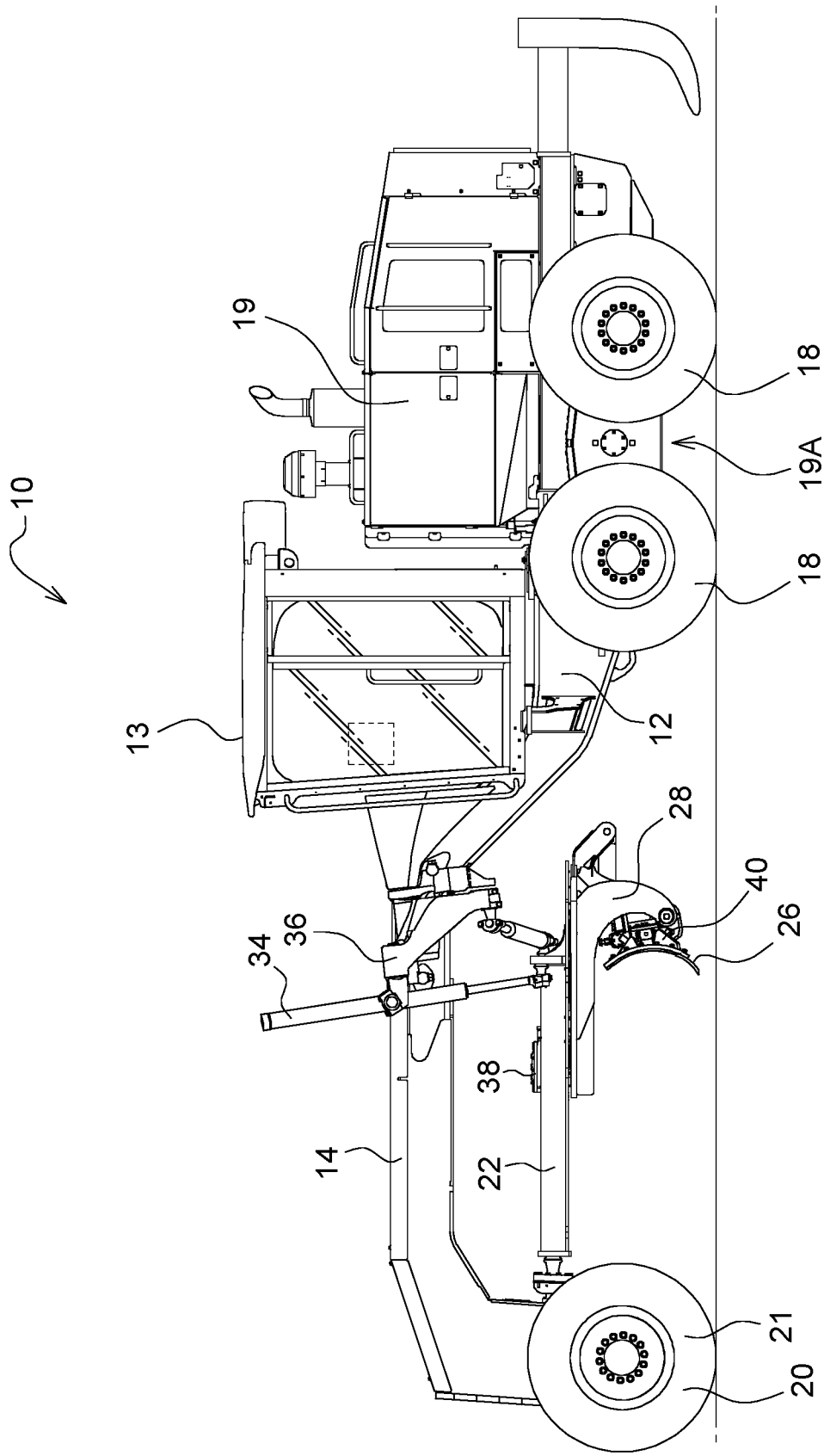
FIG. 1 is a side view of a utility vehicle with a work tool, consistent with embodiments of the present disclosure.

At least one example embodiment of the subject matter of this disclosure is understood by referring to FIGS. 1 through 6 of the drawings.

While the present disclosure has been illustrated and described in detail in the drawings and foregoing description, such illustration and description is not restrictive in character, it being understood that illustrative embodiment(s) have been shown and described and that all changes and modifications that come within the spirit of the present disclosure are desired to be protected. Alternative embodiments of the present disclosure may not include all of the features described yet still benefit from at least some of the advantages of such features. Those of ordinary skill in the art may devise their own implementations that incorporate one or more of the features of the present disclosure and fall within the spirit and scope of the appended claims.

Currently, in certain scenarios utility vehicle operators often encounter situations where it is challenging to determine the amount of pressure (i.e., downward force) to be applied to a work tool to achieve a desired amount of material movement. Some operators allow the work tool to "float" where no downward pressure is exerted by the work tool controls (e.g., no pressure by hydraulic cylinders forcing the work tool downward). This is helpful for accommodating variations in the surface being traveled by the work tool. However, this can often increase the wear on the work tool as there is no adjustment of the downward force; it is just gravity pulling the work tool towards the surface. It can be advantageous to allow for better control of the pressure exerted by the work tool on the surface.

For example, when plowing snow in winter, a motor grader is often used to clear snow from road surfaces (e.g., gravel, cement, asphalt, etc.). It is beneficial to use the "right" amount of downward pressure exerted by the work tool (e.g., a blade, bucket, etc.) on the surface. Often, the right amount of pressure minimizes wear on the work tool (e.g., wear on a work tool edge, fixed or replaceable) while maximizing the amount of material moved along the surface.

In another example, when tilling cropland, shallower tillage results in more crop residue remaining on the surface of the field where deeper tillage results in less crop residue remaining on the field surface. Maintaining an optimal or desired amount of crop residue may be desired but could be challenging based on variable soil conditions in a field, which would require frequent adjustment of tillage settings by an operator.

Achieving the desired amount of material movement and/or removal often requires frequent adjustment of the downward pressure of the work tool on the surface (e.g., frequent adjustment of the downward force by various work tool controls, such as hydraulic cylinders).

This can be because of changes on the profile of the surface (e.g., bumps, cracks, high/low spots in the surface) or differing properties of the material on the surface that is being moved/removed. For example, when removing snow, fresh, soft snow may require less downward pressure of the work tool on the surface when old, hard packed snow may require more downward pressure of the work tool to achieve the desired result.

In some situations, an operator may want to spread material while moving in reverse, depositing some of the material that accumulated on the blade during the forward grading pass. Again, this becomes a manual operation where the operator is required to, after completing a forward grading pass, to lift the blade some amount when reverse is engaged to spread the material while reversing.

Advantages for the embodiments described herein include increased productivity and reduction of operator fatigue as the operator doesn't have to change make as many adjustments of the work took downward pressure while moving material from a surface.

FIG. 1 is a side view of a utility vehicle with a work tool, consistent with embodiments of the present disclosure. FIG. 1 illustrates a utility vehicle in the form of a motor grader 10. Although a utility vehicle is illustrated and described as the motor grader 10, the utility vehicle may include, for example, bulldozers, crawlers, feller bunchers, scrapers, excavators, skid and track loaders, tractors, or any other utility vehicle that uses a work tool (e.g., a bucket, a blade, a moldboard, field cultivator, disk cultivator, tillage tool, etc.) to move material such as dirt, sand, gravel, rock, etc.

Figure 2:
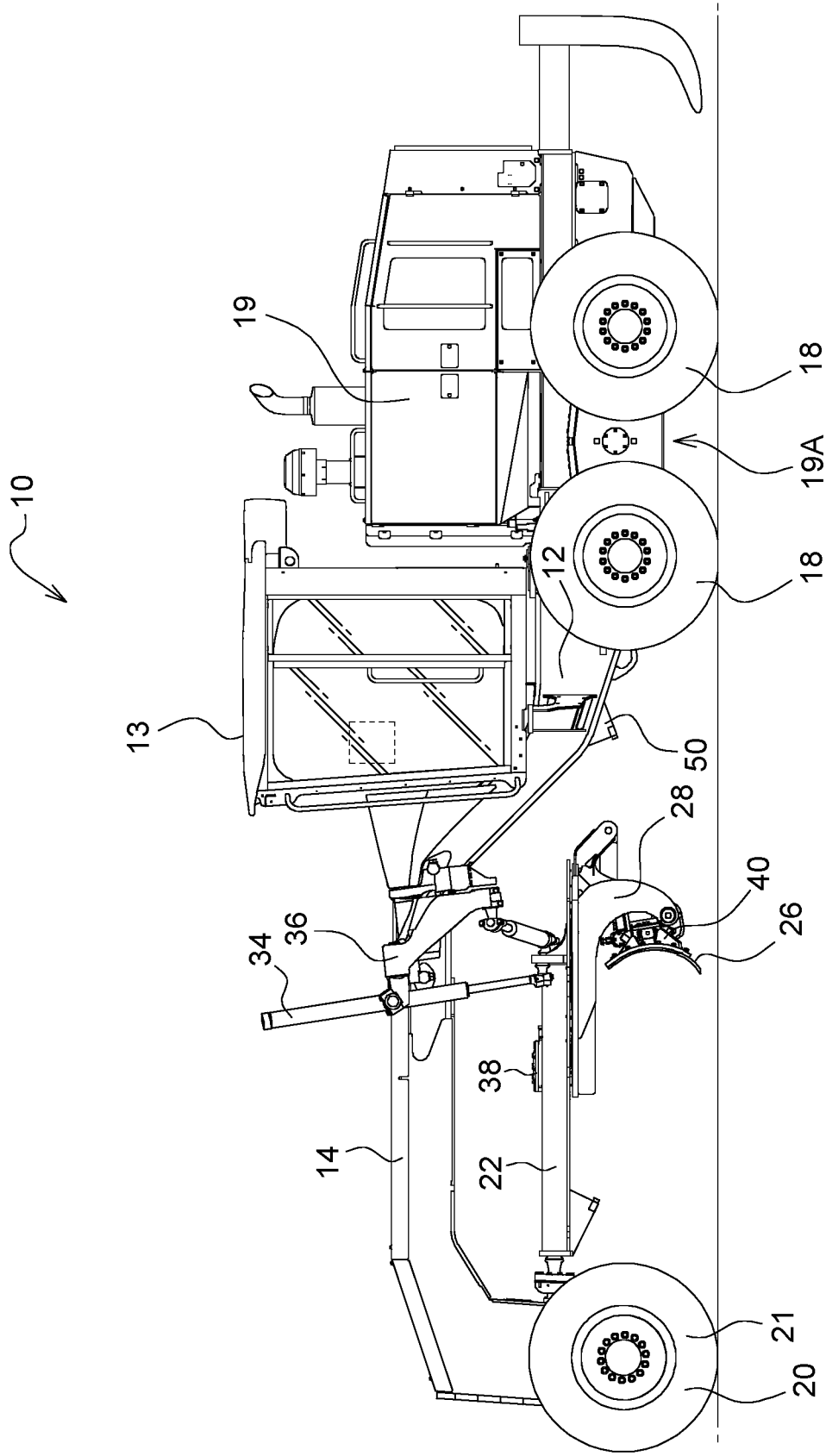
FIG. 2 is a side view of the utility vehicle of FIG. 1 with a first imaging apparatus proximate the work tool, consistent with embodiments of the present disclosure.

Motor grader 10 includes a main frame 12 and an articulated frame 14 which is pivotable with respect to main frame 12 about articulation joint 17, which includes vertical pivot 16 (FIG. 2). Such articulation effects steering of the vehicle 10 left and right using a right articulation cylinder 19 and a left articulation cylinder (not shown, but understood to be arranged symmetrically to right cylinder 19 about fore-aft axis A of vehicle 10). These left and right articulation cylinders are coupled to and extend between the main frame 12 and articulated frame 14, as shown, such that extension and contraction of the articulation cylinders reconfigures frames 12, 14 from a straight orientation to a turned orientation. Terms such as "left" and "right" are relative to a central fore-aft axis A of the vehicle 10.

Operator cab 13 is mounted atop articulated frame 14. Operator cab 13 includes operator controls, such as display unit 70 shown in FIG. 4 and described in detail below, such that a human operator can control the vehicle 10.

Motor grader 10 has two leanable front traction wheels 20 and four non-leanable rear fraction wheels 18. All of wheels 18, 20, and 21 are operably coupled to engine 212 such that wheels 18, 20, 21 may be selectively driven to propel frames 12 and 14 respectively along the ground. In particular, main frame 12 supports internal combustion engine 212 (e.g., a diesel engine) of the vehicle 10, and a tandem 25 on each side of the vehicle 10, only the right tandem being shown.

The articulated frame 14 includes a moldboard 26 (e.g., a blade) mounted thereto. The blade 26 is configured for spreading, leveling, or otherwise moving earthen or other material. In order to facilitate such operations, blade 26 is mounted to frame 14 such that blade 26 is selectively moveable in a number of directions. A draft frame 22 is coupled to articulated frame 14 toward the front via a ball-and-socket joint. A circle frame 28 is coupled to the draft frame 22 to rotate relative thereto by use of a circle drive 38 mounted to the draft frame 22. A tilt frame 40 holds the blade 26 and is coupled pivotally to the circle frame 28 for pivotal movement of the tilt frame 40 and the blade 26 held thereby relative to the circle frame 28 about a tilt axis by use of a tilt cylinder 30 (FIG. 2).

Tilt cylinder 30 is connected to circle frame 28 and tilt frame 40, such that actuation of tilt cylinder 30 changes the pitch of tilt frame 40 (and thus the moldboard 26) relative to circle frame 28. As best seen in FIG. 2, left and right blade-lift cylinders 34 (i.e., hydraulic lift cylinders) are connected to saddle 36 (which in turn is fixed to articulation frame 14) and draft frame 22 such that actuation of cylinders 34 raises and lowers the sides of draft frame 22, and thus the moldboard 26, relative to articulation frame 14. A circle side-shift cylinder 35 is connected to the saddle 36 and the draft frame 22, such that actuation of cylinder 35 effects a side-shift of draft frame 22 and circle frame 28, and thus the moldboard 26, relative to the articulation frame 14. A moldboard side-shift cylinder 32 is connected to the tilt frame 40 and the moldboard 26, such that actuation of cylinder 32 laterally translates moldboard 26 relative to tilt frame 40 along a longitudinal axis of moldboard 26. A grader circle motor 38 is coupled to draft frame 22 and operates upon grader circle 24, such that actuation of motor 38 rotates grader circle 24. The moldboard 26 is coupled to the circle frame 28 through the tilt frame 40, and grader circle 24 is fixed to circle frame 28 such that moldboard 26 rotates with circle frame 28 relative to the draft frame 22.

FIG. 2 is a side view of the utility vehicle of FIG. 1 with a first imaging apparatus proximate the work tool, consistent with embodiments of the present disclosure. The utility vehicle 10 can include a first imaging apparatus 50. The first imaging apparatus 50 can be coupled with, for example, the main frame 12 or other location (e.g., under the operator cab 13 or on the articulated frame 14) at a first position 52, where the first position 52 is rearward of the blade 26 (i.e., behind the blade 26; closer to the rear wheels 18). The position of the first imaging apparatus 50 can be any suitable location proximate the work tool (e.g., the first position 52 can be located in other locations beyond main frame 12). The first imaging apparatus 50 can be positioned to generally view the back lower portion (i.e., the side closer to the rear wheels 18) of the blade 26 and the ground proximate the blade 26 that has just been passed over by the blade.

The first imaging apparatus 50 can comprise a camera or other similar imaging device (e.g., radar, lidar, etc.) to capture images of a ground surface proximate the work tool (e.g., blade). Software stored in a non-transitory memory in a controller of a work tool control system (see additional information and discussion below for work tool control system 80) can analyze (i.e., evaluate) the images to determine how much the work tool (e.g., blade) needs to be raised (i.e., lifted above the ground) to reduce the amount of material being graded or lowered (i.e., brought closer above the ground) to increase the amount of material being graded.

For example, when removing snow from a road surface (e.g., asphalt, gravel, concrete) the work tool is generally scraping the road surface and removing some snow (or ice, etc.), but maybe not all of the snow. As the work vehicle is moving along and removing snow, the first imaging apparatus can capture a first image of the road surface immediately after the work tool has passed over that portion of the road surface (e.g., a first road surface portion or section). Software stored in the non-transitory memory can evaluate the first image by, for example, analyzing the first image for light areas(i.e., lighter portions of the surface) (e.g., snow) and dark areas (i.e., darker portions of the surface) (e.g., the road surface). A road surface can often have a different texture (i.e., a surface texture) from material being removed (e.g., road surface can be rougher texture compared to snow or ice). A road surface can also have different reflection characteristics (i.e., surface reflection) based on the type of material on the surface. A road surface may give a first reflection amount of light and a material (e.g., snow, ice, etc.) may give a second reflection amount of light.

Based on these comparisons between portions of the surface in an image, the system can vary the amount of downforce (e.g., apply more or less downforce) to one or both of the left and right blade-lift cylinders (i.e., movement mechanisms) to adjust the amount of material being removed from the surface. The adjustments in downforce can be made frequently (e.g., on the fly while operating) to adjust for variations in the surface being cleared as the utility vehicle moves along a surface. Other types of movement mechanisms are possible in various applications, including worm gears, and rack and pinion arrangements.

The analysis of the images can include comparison of a first image to reference image and/or comparison of a first image to a second image. For the comparison of a first image to a reference image, a database of exemplary images can be stored in the non-transitory computer-readable memory and accessed, by the work tool control system, during evaluation of the first image. The first image could also be evaluated with respect to a threshold. For example, the first image may be evaluated to determine if 50% of the surface potentially in contact with the blade has had material moved (e.g., 50% of the road surface still has snow after the blade has passed over that portion of the road surface). An average of the amount of surface in contact with the blade (i.e., the amount of surface graded) could also be calculated as an average over a period of time (e.g., during a shift, over the last 10 minutes, etc.).

Based on the analysis of the images, the work tool control system could automatically adjust the blade cylinder pressures to adjust the downward pressure of the blade 26 on the surface 66 depending on the ratio of roadway 66A to material 66B in each image captured by the first imaging apparatus 50. The left and right blade lift cylinder pressures can be monitored by cylinder pressure sensors (not shown) on the left and right blade lift cylinders 34.

The downward pressure of the blade 26 can also be adjusted based on cylinder position sensors without the blade cylinder pressure. The left and right blade lift cylinders 34 can each contain a cylinder position sensor to detect a current position of each cylinder 34. Based on geometry of the work vehicle 10, evaluation of the images captured by the first imaging apparatus 50, signals can be sent to change the position of the left and right blade lift cylinders 34 to increase and/or decrease the amount of material being moved by the blade 26 along the surface 66.

In some embodiments, different portions of the images can be compared. For example, on a motor grader, the blade can be adjusted up and down on each side (e.g., the left side and the right side using the left and right blade lift cylinders 34). This could allow for comparison of a left section (i.e., a first section) of a first image with a left section (i.e., a second section) of a second image and comparison of a right section of a first image with a right section of a second image. The image could be divided into any desired number of sections for analysis (e.g., 2 sections, 3 sections, 4 sections, 5 sections, etc.) The downward pressure on the left side of the blade (e.g., by adjusting the left blade cylinder) could be independently adjusted with respect to the downward pressure of the right side of the blade (e.g., by adjusting the right blade cylinder).

The side-shift cylinder 35 could be used to expand the area of coverage of the blade as it clears the ground surface as the side-shift cylinder adds some extra range of coverage of the blade to the left or to the right. For example, a position of the work tool could be adjusted based on a width of the surface. The work tool control system could be configured to evaluate images from the first imaging apparatus to see if there are areas of the ground surface outside of the current area of blade coverage and, through the non-transitory computer-readable memory storing instructions, adjust the blade using the side-shift cylinder 35 to the left or the right as needed.

A display (e.g., a monitor) can be used to display information related to the work tool control system. See below for additional details.

Figure 3:
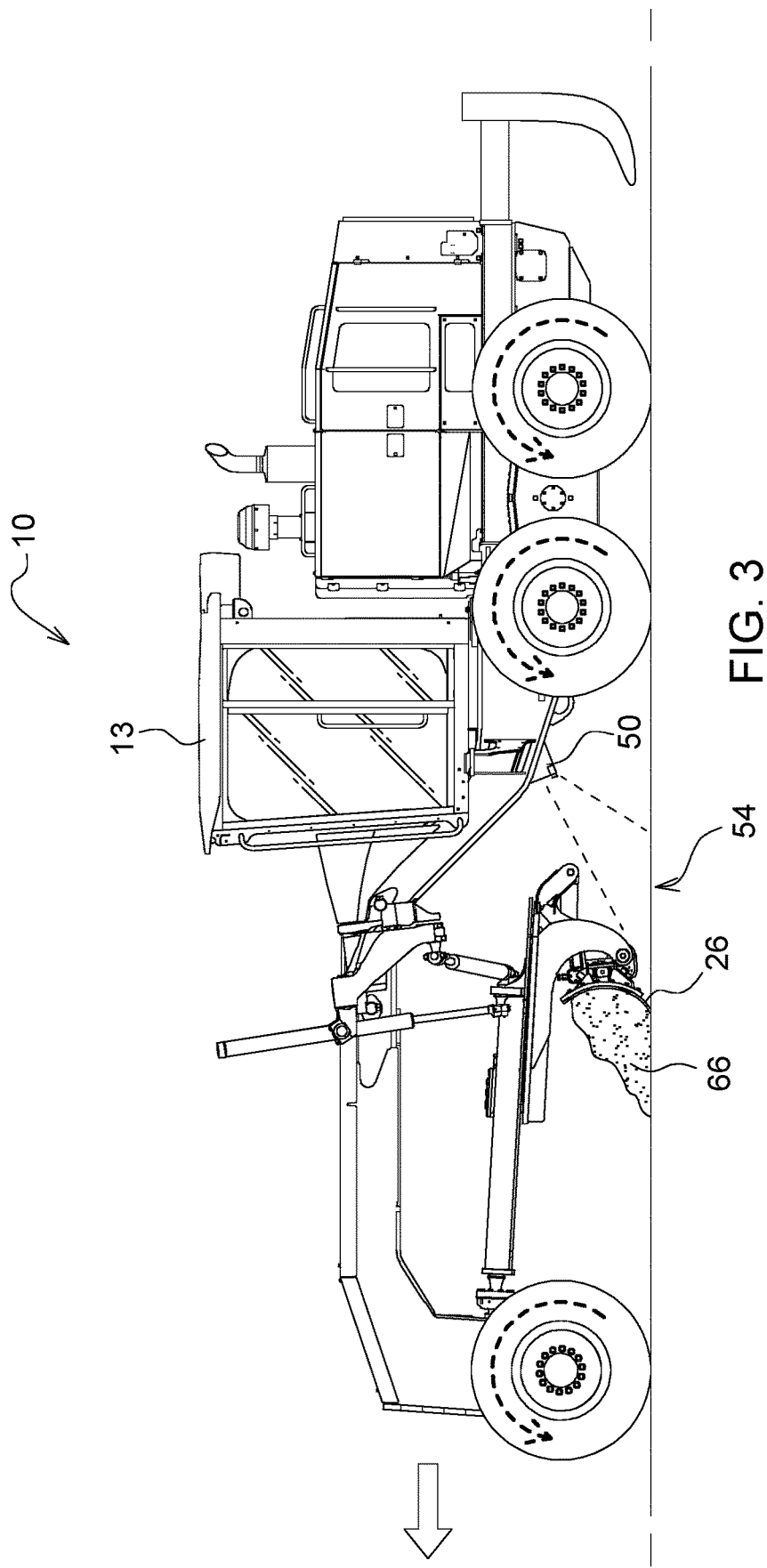
FIG. 3 is a side view of a utility vehicle with the work tool of a utility vehicle moving material, consistent with embodiments of the present disclosure.

FIG. 3 is side view of a utility vehicle with the work tool of a utility vehicle moving material, consistent with embodiments of the present disclosure. The operator, by way of the operator interface, (or a remote operator or an autonomous operator system) can cause the work vehicle 10 to move forward to spread/move material 66 with the blade 26. The first imaging apparatus 50 can view the surface 54 proximate the blade 26 after the blade 26 has passed over the surface 54.

Figure 4:
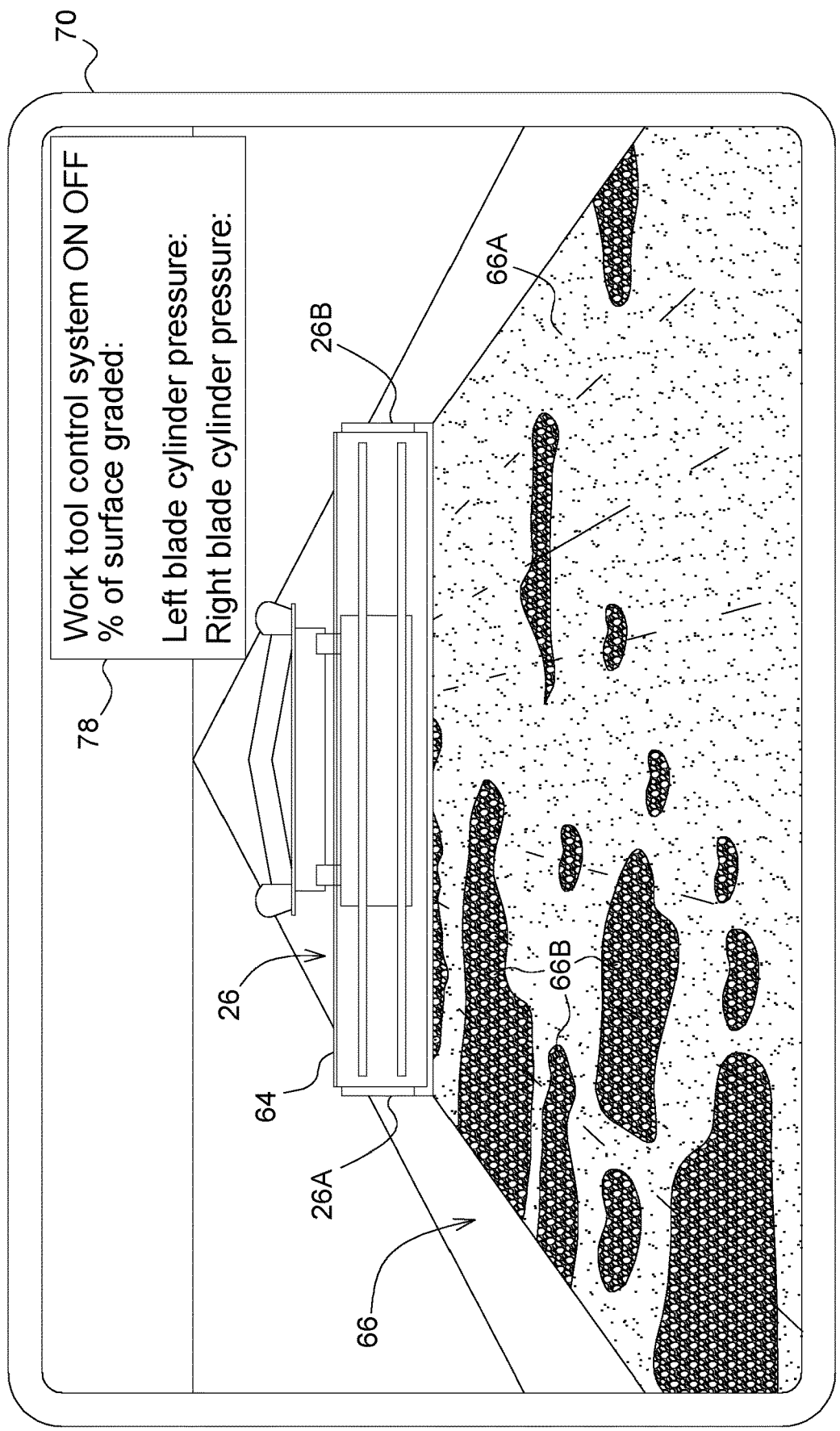
FIG. 4 is an image of a display showing information related to the work tool control system, consistent with embodiments of the present disclosure.

FIG. 4 is an image of a display showing information related to the work tool control system, consistent with embodiments of the present disclosure. A display 70 can show, for example, whether the work tool control system 50 is engaged or disengaged (i.e., turned on or turned off), a current operator setting, left and right cylinder pressures, left and right cylinder positions, percentage of downforce being applied by the left and right cylinders. The display can also show a percentage of a surface 66 being graded (i.e., cleared of snow) in real-time. For example, the display could show that the surface is 20% graded, 50% graded, 73% graded. Any percentage from 0-100% is possible. As the display shows the surface 66, areas of different material coverage could be shown. For example, the surface 66 could include a roadway 66A (e.g., asphalt, gravel, concrete) with material 66B (e.g., snow, sand, dirt, etc.) on the roadway. In some instances, the system could be set for 100% downforce, yet the surface may not be 100% of material after the work tool has passed. This is an indication that 100% removal is outside of the system limitations at that location.

As the utility vehicle 10 moves along while using the work tool control system, historical material removal data could be stored (e.g., locally in non-transitory computer-readable memory, or on a server in the cloud, to be accessed at a later time but one utility vehicle or multiple utility vehicles). The historical material removal data could include (a) information about the percentage of material moved on a surface and the amount of downward pressure required to achieve that result, (b) information about the percentage of material moved on a surface and the blade position required to achieve that result, (c) information about (a) and/or (b) along with location information tied to specific images captured by the work tool control system (d) information about (a), and/or (b), and/or (c) along with time of day, and (e) environmental conditions.

For example, the time of day could affect how much force is required to achieve a certain percentage of material removal from a roadway (e.g., during the daytime, sunlight could make snow softer, allowing for easier removal with less force compared to nighttime, where lack of sunlight would make the snow harder requiring more force for a similar percentage of snow removed from a surface).

As the blade 26 (including left blade end 26A and right blade end 26B) moves along the surface 66, different amount of material 66B will be moved or left behind, depending on the downward pressure of the blade and variations in the shape of the surface 66. As described herein, the work tool control system can evaluate the images captured by the first imaging apparatus 50 based on the differences of each image as the work vehicle travels along the surface 66.

The display 70 can also include information about the blade 26 position, such as, whether the blade 26 is in a grading position (e.g., generally in contact with the ground (e.g., material) and cutting into the surface) or in a lifted position (e.g., generally not in contact with the ground (e.g., material) and lifted higher than the grading position. The display 70 can include one or more of text characters (i.e., letters and/or numbers), and graphical images related to the information described above.

Figure 5:
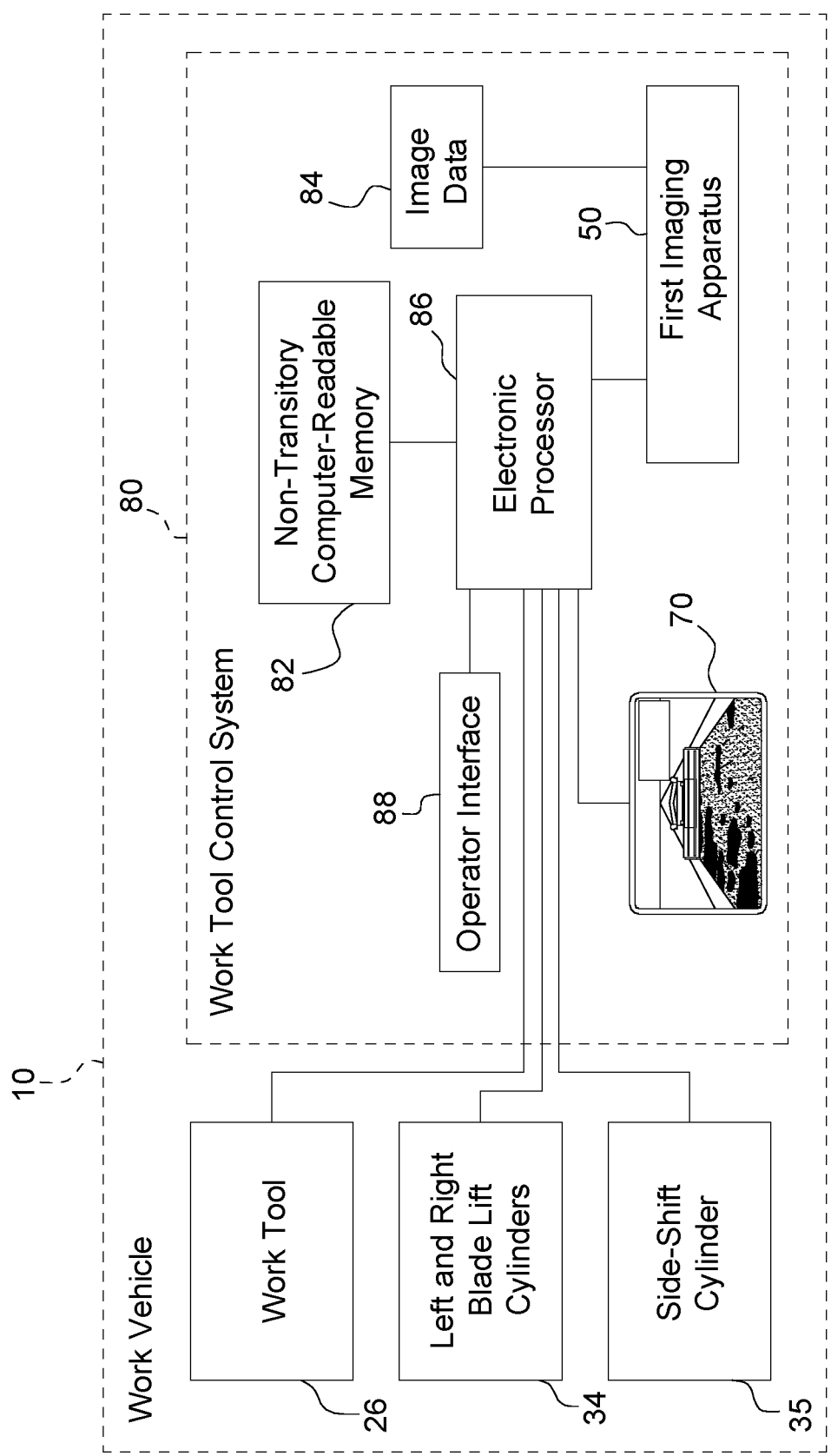
FIG. 5 is a schematic diagram of the work tool control system, consistent with embodiments of the present disclosure.

FIG. 5 is a schematic diagram of the work tool control system, consistent with embodiments of the present disclosure. In FIG. 5, the various inputs and outputs of the work tool control system 80 are shown. Inputs to the work tool control system 80 can include an operator interface 88, a first imaging apparatus 50, a blade position of the work tool 26 (e.g., from left and right blade-lift cylinders 34), a pressure being exerted by the blade on the ground surface (via pressure sensors on the left and right blade-lift cylinders 34). Additional inputs could include a vehicle location (e.g., GPS data), time of day, ambient temperature and other weather data or environmental conditions.

The operator interface 88 could be used to input or set thresholds or ranges with regards to the work tool control system 80. For example, the operator interface could be used to set a range for the percentage of the surface 66 to be cleared of material 66A (e.g., a minimum of 50% and a maximum of 80%; or a minimum of 60% and a maximum of 90%, etc.).

Outputs from the work tool control system 80 can include a signal to the left and right blade-lift cylinders 34 (e.g., to the hydraulic valves for those cylinders to raise or lower the blade 26. The signal to the left blade-lift cylinder 34 or the right blade-lift cylinder 34 can include adjusting the corresponding pressure valves to change the amount of pressure applied to cylinders 34. Another output from the electronic processor 86 can include one or more signals to a display monitor.

The blade control system 80 also has a non-transitory computer-readable memory 82 that stores image data 84. The non-transitory computer-readable memory 82 may comprise electronic memory, nonvolatile random-access memory, an optical storage device, a magnetic storage device, or another device for storing and accessing electronic data on any recordable, rewritable, or readable electronic, optical, or magnetic storage medium.

The second image 60 can be compared, by a program stored on the non-transitory computer-readable memory 82, to the first image 58. The display 70 can also show one or more of the first image, 58, the second image 60, the comparison of the first image 58 and the second image 60 the ground surface proximate the blade 26 (i.e., work tool).

An electronic processor 86 is provided and configured to perform an operation by controllably adjusting a position of the work tool 26 relative to the utility vehicle 10 and capturing and processing images from the first imaging apparatus 50. The electronic processor 86 may be arranged locally as part of the utility vehicle 10 or remotely at a remote processing center (not shown). In various embodiments, the electronic processor 86 may comprise a processor, a microprocessor, a microcontroller, a controller, a central processing unit, a programmable logic array, a programmable logic controller, or other suitable programmable circuitry that is adapted to perform data processing and/or system control operations. The electronic processor 86 executes or otherwise relies upon computer software applications, components, programs, objects, modules, or data structures, etc. Software routines resident in the included memory of the electronic processor 86 or other memory are executed in response to signals received.

The computer software applications, in other embodiments, may be located in the cloud. The executed software includes one or more specific applications, components, programs, objects, modules, or sequences of instructions typically referred to as "program code". The program code includes one or more instructions located in memory and other storage devices which execute the instructions which are resident in memory, which are responsive to other instructions generated by the system, or which are provided by an operator interface 88 operated by the user (e.g., located in the operator cab or at a remote location). The electronic processor 86 is configured to execute the stored program instructions.

Figure 6:
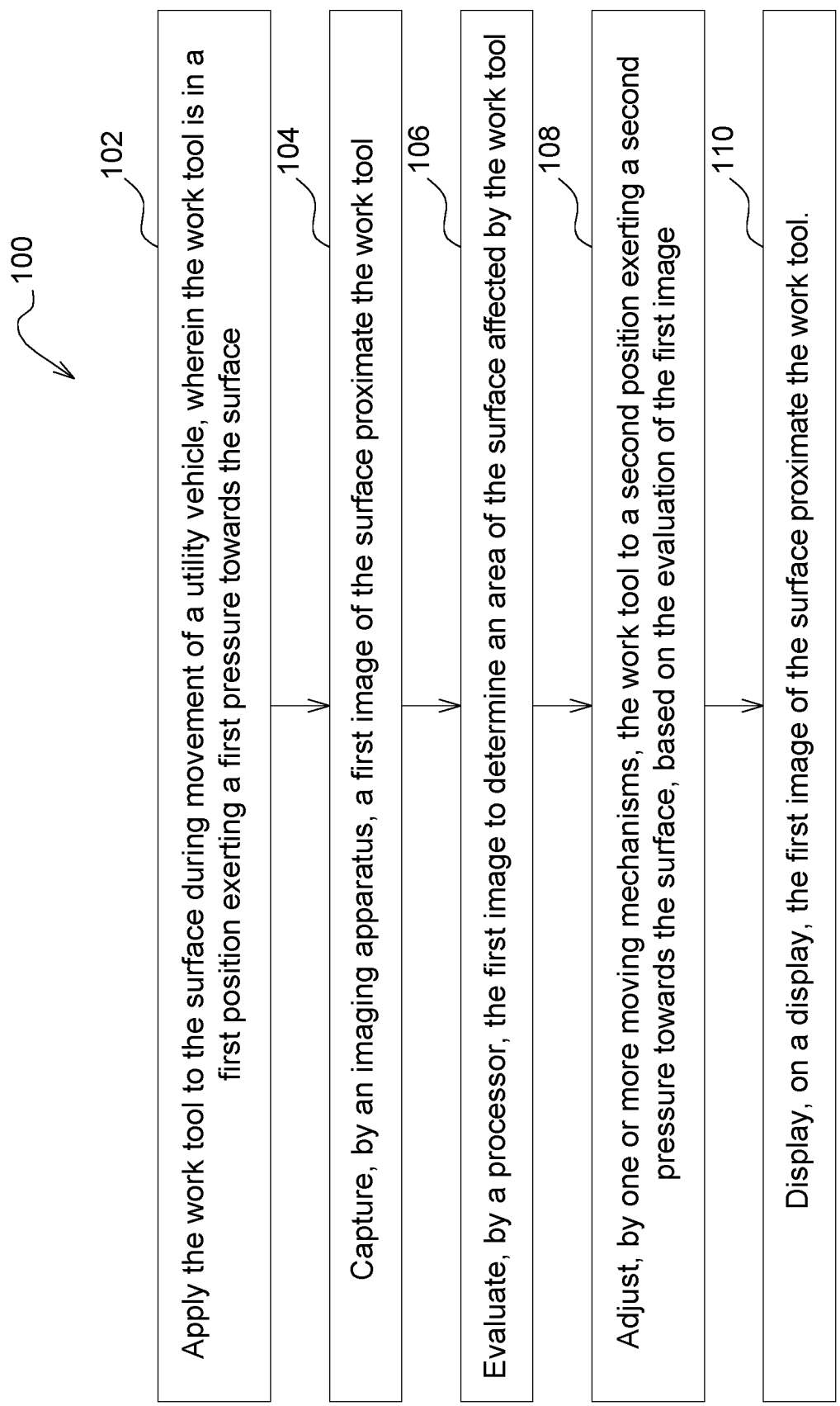
FIG. 6 is a flow diagram showing a method of moving material with a work tool, consistent with embodiments of the present disclosure.

FIG. 6 is a flow diagram showing a method of moving material with a work tool, consistent with embodiments of the present disclosure. The method 100 can include a step 102 of applying the work tool to the surface during movement of a utility vehicle, wherein the work tool is in a first position exerting a first pressure towards the surface, a step 104 of capturing, by an imaging apparatus, a first image of the surface proximate the work tool, a step 106 of evaluating, by a processor, the first image to determine an area of the surface affected by the work tool, and a step 108 of adjusting, by one or more moving mechanisms, the work tool to a second position exerting a second pressure towards the surface, based on the evaluation of the first image.

The second position can include, for example, a position that places the work tool closer to the surface based on a higher pressure exerted towards the surface. In one embodiment, the first position might be a first portion of a pass over a surface being graded with the work vehicle having a blade in a the first grading position and moving forward, then based on image analysis of the surface during grading, the blade could move to a second position above the surface in a second portion of the pass where the blade is closer to the surface due to an increase in downward pressure on the blade, resulting in additional material being moved by the blade.

The second position can also include, for example, a position that places the work tool further from the surface based on a lower pressure exerted towards the surface. In this embodiment, the first position might be a first portion of a pass over a surface being graded with the work vehicle having a blade in a the first grading position and moving forward, then based on image analysis of the surface during grading, the blade could move to a second position above the surface in a second portion of the pass where the blade is further from the surface due to a decrease in downward pressure on the blade, resulting in less material being moved by the blade.

The method 100 can further comprise the step 110 of displaying on a display (e.g., display 70) one or more of the automatic work tool lift system status, the distance from the work tool to the surface, the first position of the work tool, and the second position of the work tool.

What is claimed is:

1. A system for controlling a work tool for a utility vehicle, the system comprising:
   the work tool;
   one or more movement mechanisms coupled with the work tool, the movement mechanism comprising a left work tool lift cylinder and a right work tool lift cylinder;
   an imaging apparatus coupled to the utility vehicle;
   a non-transitory computer-readable memory storing operation information; and
   an electronic processor configured to:
   apply the work tool to a surface during movement of a utility vehicle, wherein the work tool is in a first position exerting a first left work tool lift pressure and a first right work tool lift pressure towards the surface,
   capture, by the imaging apparatus, an image of the surface proximate the work tool and behind the work tool,
   evaluate, by the electronic processor, the image to determine an area of the surface affected by the work tool wherein the evaluation of the image comprises comparing lighter portions of the image with darker portions of the image, and
   adjust, by the one or more movement mechanisms, the work tool to a second position exerting a second left work tool lift pressure and a second right work tool lift pressure towards the surface, based on the evaluation of the image.

2. The system of claim 1, wherein the work tool comprises a mortar board, a blade, a bucket, a scraper, and a plow.

3. The system of claim 1, wherein the imaging apparatus comprises a camera.

4. The system of claim 1, wherein the movement mechanism further comprises a side-shift cylinder configured to adjust a position of the work tool to a left or a right based on a width of the surface and the evaluation of the image.

5. The system of claim 1, wherein the evaluation of the image comprises comparing, by the electronic processor, a surface texture or a surface reflection to determine an affected percentage of the surface and an unaffected percentage of the surface.

6. The system of claim 1, wherein the evaluation of the image comprises evaluation of a first section of the image and a second section of the image wherein the first section representing a left section affected by the downward pressure on a left side of the work tool and the second section representing a right section affected by the downward pressure on a right side of the work tool.

7. A method of adjusting a pressure applied to a work tool on a surface, the method comprising:
   applying the work tool to the surface during movement of a utility vehicle, wherein the work tool is in a first position exerting a first pressure towards the surface;
   capturing, by an imaging apparatus, an image of the surface proximate the work tool, immediately after the surface is affected;
   evaluating, by an electronic processor, the image to determine an area of the surface affected by the work tool, wherein an evaluation of the image comprises comparing lighter portions of the image with darker portions of the image, and by comparing a surface reflection and a surface texture to an unaffected surface; and
   adjusting, by one or more moving mechanisms, the work tool to a second position exerting a second pressure towards the surface, based on the evaluation of the image.

8. The method of claim 7, wherein the second position places the work tool closer to the surface based on a higher pressure exerted towards the surface by the work tool.

9. The method of claim 7, wherein the second position places the work tool further from the surface based on a lower pressure exerted towards the surface by the work tool.

10. The method of claim 7, wherein the one or more moving mechanisms comprises one or more of a hydraulic cylinder, a worm gear, and a rack and pinion gear.

11. The method of claim 7, further comprising displaying, on a display, the image of the surface proximate the work tool.

12. A utility vehicle comprising:
    a work tool;
    one or more movement mechanisms coupled with the work tool, the movement mechanism comprising a left work tool lift cylinder and a right work tool lift cylinder;
    an imaging apparatus;
    a non-transitory computer-readable memory storing operation information; and
    an electronic processor configured to:
    apply the work tool to a surface during movement of the utility vehicle, wherein the work tool is in a first position exerting a first work left work tool lift pressure and a first right work tool lift pressure towards the surface,
    capture, by the imaging apparatus, an image of the surface proximate the work tool and behind the work tool,
    evaluate, by the electronic processor, the image to determine an area of the surface affected by the work tool wherein the evaluation of the image comprises comparing lighter portions of the image with darker portions of the image, and
    adjust, by the one or more movement mechanisms, the work tool to a second position exerting a second left work tool lift pressure and a second right work tool lift pressure towards the surface, based on the evaluation of the image.

13. The utility vehicle of claim 12, wherein the first imaging apparatus comprises a camera.

14. The utility vehicle of claim 12, wherein the movement mechanism further comprises a side-shift cylinder, the electronic processor is further configured to adjust a position of the work tool to a left or a right based on a width of the surface and the evaluation of the image.

15. The utility vehicle of claim 13, wherein the evaluation of the image comprises comparing, by the electronic processor, lighter portions of the image with darker portions of the image to determine an affected percentage of the surface indicated by the darker portions and an unaffected percentage of the surface indicated by the lighter portions.

16. The utility vehicle of claim 13, wherein the evaluation of the image comprises comparing, by the electronic processor, a surface texture or a surface reflection to determine an affected percentage of the surface and an unaffected percentage of the surface.

17. The utility vehicle of claim 13, wherein the evaluation of the image comprises evaluation of a first section of the image and a second section of the image wherein the first section representing a left section affected by the downward pressure on a left side of the work tool and the second section representing a right section affected by the downward pressure on a right side of the work tool.

18. The system of claim 5, wherein a minimum threshold for the percentage of the surface to be affected can be set before enabling adjustment of the movement mechanism based on the evaluation of the image.

19. The system of claim 1, wherein the evaluation of the image comprises comparing lighter portions of the image with darker portions of the image to determine an affected percentage of the surface indicated by the darker portions and an unaffected percentage of the surface indicated by the lighter portions.

20. The system of claim 19, wherein the adjustment by the movement mechanism is further based on a historical data, the historical data associated with the affected surface and the left work tool lift pressure and the right work tool lift pressure.

* * * * *